(12) United States Patent
Critchfield

(10) Patent No.: US 7,152,179 B1
(45) Date of Patent: Dec. 19, 2006

(54) IP REDUNDANCY WITH IMPROVED FAILOVER NOTIFICATION

(75) Inventor: Graham Critchfield, Hemel Hempstead (GB)

(73) Assignee: Cisco Technology, Inc., San Jose, CA (US)

( * ) Notice: Subject to any disclaimer, the term of this patent is extended or adjusted under 35 U.S.C. 154(b) by 659 days.

(21) Appl. No.: 10/251,497

(22) Filed: Sep. 19, 2002

(51) Int. Cl.
*G06F 11/00* (2006.01)

(52) U.S. Cl. .............................. 714/4; 714/5
(58) Field of Classification Search ............... 714/4, 714/5
See application file for complete search history.

(56) References Cited

U.S. PATENT DOCUMENTS

| | | | | |
|---|---|---|---|---|
| 5,473,599 | A * | 12/1995 | Li et al. ..................... | 370/219 |
| 5,963,540 | A * | 10/1999 | Bhaskaran ................. | 370/218 |
| 6,754,220 | B1 * | 6/2004 | Lamberton et al. ......... | 370/401 |
| 6,885,667 | B1 * | 4/2005 | Wilson ....................... | 370/392 |
| 2001/0048661 | A1 * | 12/2001 | Clear et al. ................ | 370/218 |

OTHER PUBLICATIONS

Network Working Group, RFC 2338 "Virtual Router Redundancy Protocol," Apr. 1998.

Network Working Group, RFC 2281 "Cisco Hot Standby Router Protocol (HSRP)," Mar. 1998.

* cited by examiner

*Primary Examiner*—Scott Baderman
*Assistant Examiner*—Timothy M. Bonura
(74) *Attorney, Agent, or Firm*—Beyer, Weaver & Thomas LLP.

(57) ABSTRACT

Redundant gateway methods, apparatus and systems use more than one gateway device in a gateway device group for communications directed outside of a LAN. Failover services are thus provided in the event that an active router or other gateway device fails. A failover monitoring unit includes a memory and a processor coupled to the memory. The monitoring unit also includes gateway ports connected to the processor. Each gateway port is configured to connect a gateway device to the monitoring unit. The monitoring unit is configured to collect and store redundancy group data pertaining to a redundancy group comprising a plurality of gateway devices connected to the monitoring unit. The redundancy group includes an active gateway device and one or more standby gateway devices. The monitoring unit monitors the gateway ports to detect failure of an active gateway device. When a failure is detected, the monitoring unit notifies each redundancy group standby gateway device of the active gateway device failure.

45 Claims, 6 Drawing Sheets

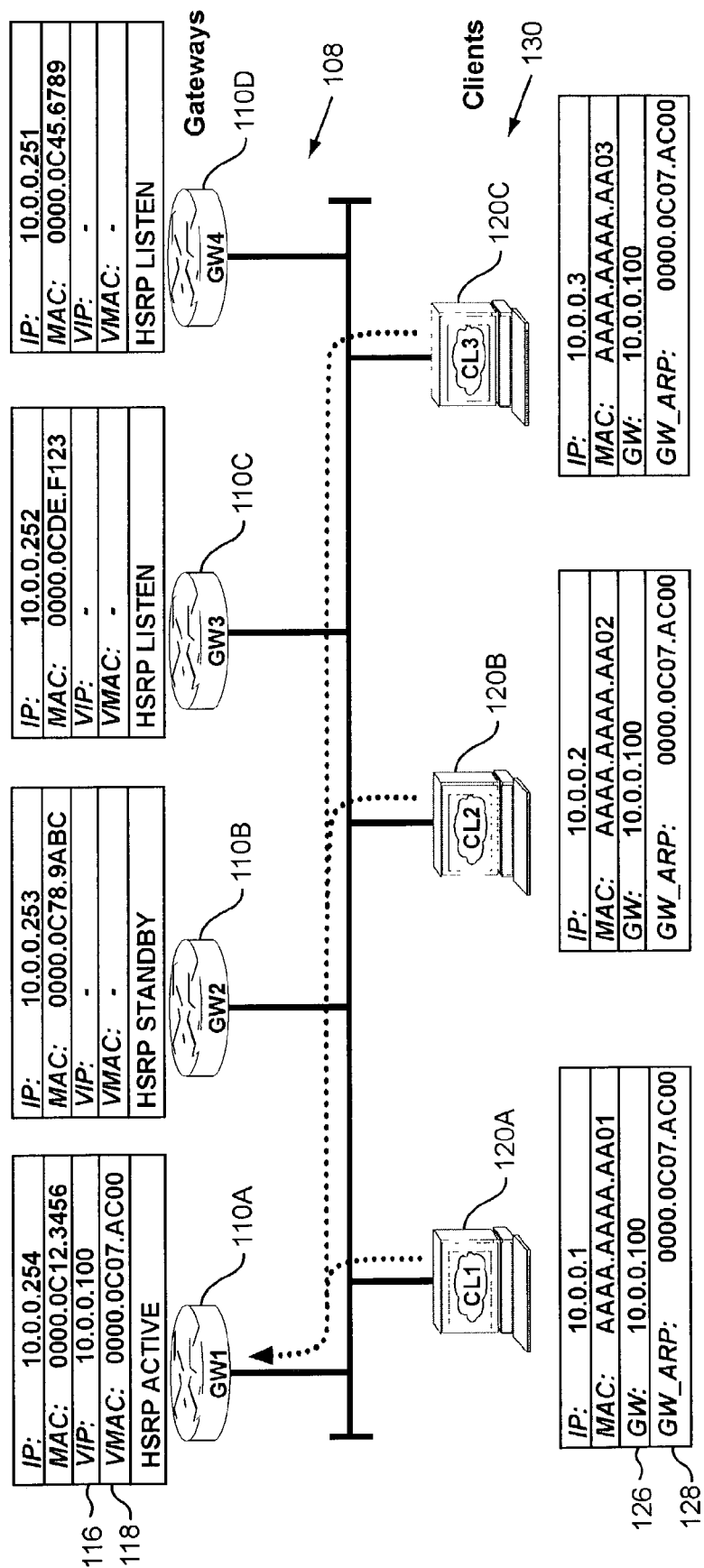
Figure 1A. HSRP with 4 participating routers in Normal mode

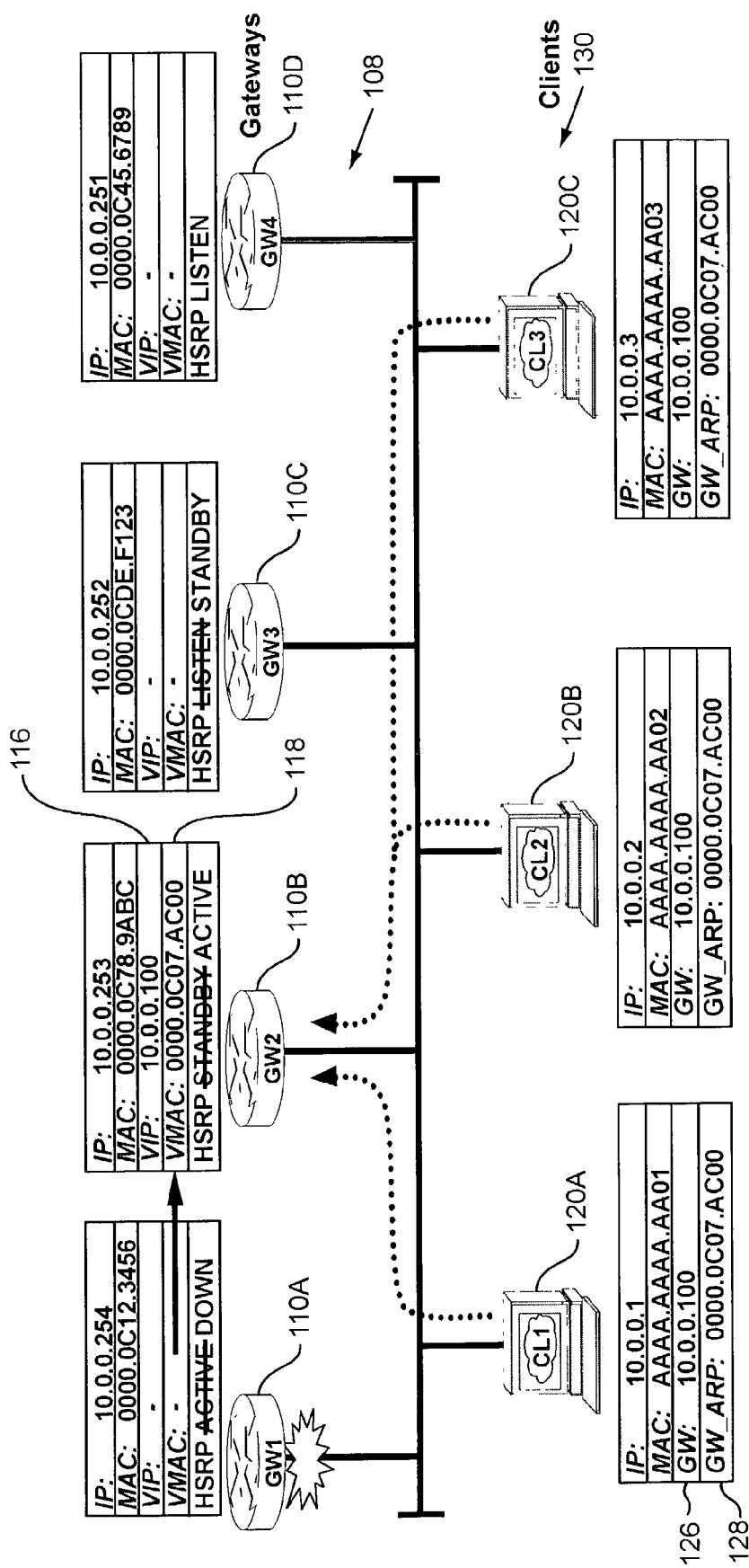
Figure 1B. HSRP with 4 participating routers in Failover mode

IP REDUNDANCY WITH IMPROVED FAILOVER NOTIFICATION

BACKGROUND OF THE INVENTION

The present invention relates generally to network systems using redundant or standby devices working together in a redundancy group to provide a virtual router service. More particularly, the present invention relates to methods and apparatus for providing improved failover notification to redundancy group members when the primary member ceases to function, allowing failover (that is, change over) to another group member and thus allowing continued virtual router service.

As noted above, local area networks (LANs) are commonly connected with one another through one or more routers so that a host (a PC or other arbitrary LAN entity) on one LAN can communicate with other hosts on different LANs. Typically, the host is able to communicate directly only with the entities on its local LAN segment. When it receives a request to send a data packet to an address that it does not recognize as being local, it communicates through a router (or other layer-3 or gateway device) which determines how to direct the packet between the host and the destination address in a remote network. Unfortunately, a router may, for a variety of reasons, become inoperative (e.g., a power failure, rebooting, scheduled maintenance, etc.) creating a trigger event. Such potential router failure has led to the development and use of redundant systems, which have more than one router to provide a back up in the event of primary router failure. When a router fails, the host communicating through the inoperative router may still communicate with other LANs if it can send packets to another router connected to its LAN.

Various protocols have been devised to allow a host to choose a router from among a group of routers in a network. Two of these, Routing Information Protocol (or RIP) and ICMP Router Discovery Protocol (IRDP) are examples of protocols that involve dynamic participation by the host. However, because both RIP and IRDP require that the host be dynamically involved in the router selection, performance may be reduced and special host modifications and management may be required.

In a widely used and somewhat simpler approach, the host recognizes only a single "default router" (which also may be referred to as a "default gateway" in some instances). As will be appreciated by those skilled in the art, in many instances, the terms "router" and "gateway" may be used interchangeably in this disclosure. In this approach, the host is configured to send data packets to the default router when it needs to send packets to addresses outside its own LAN. It does not keep track of available routers or make decisions to switch to different routers. This requires very little effort on the host's part, but has a serious danger. If the default router fails, the host cannot send packets outside of its LAN. This may be true even though there may be a redundant router able to take over, because the host does not know about the backup. Unfortunately, such systems have been used in mission critical applications such as stock trading.

The shortcomings of these early systems led to the development and implementation of redundant gateway systems, which allow for failover recovery. "Failover" is defined as the substitution of a new gateway device for one that has failed or is otherwise not available, wherein the new gateway device assumes the duties and functionalities of the failed device. For example, a gateway device operating in a standby operating mode may take over for another gateway device that was operating in an active operating mode prior to its failure.

One such system is the Hot Standby Router Protocol (HSRP) by Cisco Systems, Inc. of San Jose, Calif. A more detailed discussion of the earlier systems and of an HSRP type of system can be found in U.S. Pat. No. 5,473,599 (referred to herein as "the '599 patent"), entitled STANDBY ROUTER PROTOCOL, issued Dec. 5, 1995 to Cisco Systems, Inc., which is incorporated herein by reference in its entirety for all purposes. Also, HSRP is described in detail in RFC 2281, entitled "Cisco Hot Standby Router Protocol (HSRP)", by T. Li, B. Cole, P. Morton and D. Li, which is incorporated herein by reference in its entirety for all purposes.

Another redundancy gateway system is the Virtual Router Redundancy Protocol (VRRP), which is an election protocol that dynamically assigns responsibility for packet forwarding to one of a group of VRRP routers on a LAN. A VRRP router is configured to run the VRRP protocol in conjunction with one or more other routers attached to a LAN. In a VRRP setup, one router is elected as the "Master" router with the other routers acting as "Backup" in case of the failure of the Master router. VRRP is described in detail in RFC 2338, entitled "Virtual Router Redundancy Protocol", by S. Knight, et al., which is incorporated herein by reference in its entirety for all purposes.

HSRP is widely used to back up primary routers for a network segment. In HSRP, a "Standby" router is designated as the back-up to an "Active" router. The Standby router is linked to the network segment or segments serviced by the Active router. The Active and Standby routers share a "virtual IP address" and possibly a "virtual Media Access Control (MAC) address" which is actually in use by only one router at a time. All Internet communication from the relevant private network employs the virtual IP and MAC addresses. At any given time, the Active router is the only router adopting and using the virtual addresses. Then, if the Active router should cease operation for any reason, the Standby router takes over the Active router's load (by adopting the virtual addresses). This allows the host to always direct data packets to an operational router without monitoring the routers of the network.

A Cisco HSRP system is shown in FIGS. 1A and 1B. As seen in FIG. 1A, four gateways 110A–D operate in a normal mode, providing redundant default gateway services in an active/standby configuration for a common IP subnet. In FIG. 1A, the multiple routers 110A–D form a redundancy group 108 (RG) and share a virtual MAC address 118 and a virtual IP address 116. Hosts 120A–C on a common subnet 130 set their default gateway IP address 126 and MAC address ARP cache 128 to the virtual addresses 116, 118 within RG 108 for their subnet. In an RG 108 of a prior HSRP system, an "active" RG member 110A (for example, an "Active HSRP enabled router") is elected based on pre-configured priorities or other suitable criteria and/or methodologies.

The initial Active router 110A of the RG 108 responds to all address resolution protocol ("ARP") requests (or any similar or analogous mechanisms used by the router for providing address information to requesting parties) for the virtual IP address 116, thus providing default gateway services for all hosts 120 of the common subnet 130 during normal operation. During normal operation, a secondary RG member of the RG 108 (for example, member 10B in FIG. 1A) remains in a "Standby" mode. If the primary member 110A of the RG 108 should fail, as shown in FIG. 1B, the Standby router 110B will assume the virtual MAC address 118 and the virtual IP address 116, thus effectively becoming the primary member (or "Active router") and thereafter providing uninterrupted gateway services to all of the hosts 120 of common subnet 130 without the need for additional ARP discovery and/or resolution. This configuration provides a reliable failover function for the gateway devices.

VRRP provides a service that is functionally similar to HSRP. VRRP denotes the HSRP Active Router as a Master Router and any HSRP Standby/Listen Routers as Backup Routers. VRRP employs a virtual IP address and a virtual MAC address mechanism in a manner analogous to HSRP, providing hosts with a default Virtual Router or Gateway for communicating outside of the local LAN.

First hop redundancy protocols such as VRRP and HSRP typically have a failover period of several seconds during which time traffic is not being forwarded. This delay is due to the detection mechanism used in these protocols. In VRRP, the failure of a Master router is detected via the non-receipt of Master advertisements for 3 Hello periods plus any skew time. For example, a typical advertisement period is 1 second, meaning that a failed Master typically would be detected after 3–4 seconds. Such delays are not effective for supporting a high-availability routing environment in which only the active router or gateway device is supposed to route traffic. HSRP employs a similar failover mechanism which typically waits for 3 Hello periods (also referred to in HSRP as the Holdtime) before changing over to a new Active router or other gateway device.

In view of the foregoing, it would be desirable to provide redundant gateway services having improved failover notification.

SUMMARY OF THE INVENTION

The present invention relates to redundant gateway methods, apparatus and systems using more than one gateway device in a gateway device group for communications directed outside of a LAN. Failover services are thus provided in the event that an active router or other gateway device fails.

A failover monitoring unit according to one embodiment of the present invention includes a memory and a processor coupled to the memory. The monitoring unit also includes gateway ports connected to the processor. Each gateway port is configured to connect a gateway device to the monitoring unit. The monitoring unit is configured to collect and store redundancy group data pertaining to a redundancy group comprising a plurality of gateway devices connected to the monitoring unit. The redundancy group includes an active gateway device and one or more standby gateway devices. The monitoring unit monitors the gateway ports to detect failure of an active gateway device. When a failure is detected, the monitoring unit notifies each redundancy group standby gateway device of the active gateway device failure.

In a different embodiment of the present invention, a method of performing failover in a redundancy group includes collecting and storing redundancy group data in a monitoring unit connected to a redundancy group, where the redundancy group includes a plurality of gateway devices. These redundancy group gateway devices include an active gateway device and a standby gateway device. According to the method, the monitoring unit monitors the redundancy group gateway devices and detects a failure of the redundancy group active gateway device. Once an active gateway device failure is detected, the monitoring unit notifies the redundancy group standby gateway device of the active gateway device failure. In one embodiment, the step of detecting a failure of the redundancy group active gateway device comprises detecting failure of a gateway device connected to the monitoring unit and thereafter consulting the redundancy group data to determine whether the failed gateway device is the active gateway device.

In a different embodiment of the present invention, an apparatus for performing failover in a redundancy group has means for collecting and storing redundancy group data in a means for monitoring to a redundancy group connected to the monitoring means, where the redundancy group comprises a plurality of gateway devices comprising an active gateway device and a standby gateway device. The apparatus also has means for monitoring the redundancy group gateway devices and means for detecting a failure of the redundancy group active gateway device. Once the apparatus has detected an active gateway device failure, the apparatus uses means for notifying the redundancy group standby gateway device of the active gateway device failure to effect failover.

In one other embodiment of the present invention, a computer program product for implementing a method of performing failover in a redundancy group has computer code for collecting and storing redundancy group data in a monitoring unit connected to a redundancy group, where the redundancy group comprises a plurality of gateway devices comprising an active gateway device and a standby gateway device. The computer program product also contains computer code for monitoring the redundancy group gateway devices and computer code for detecting a failure of the redundancy group active gateway device. The product also has computer code for notifying the redundancy group standby gateway device of the active gateway device failure.

In each of the aforementioned embodiments, the monitoring unit can be a layer 2 switch. Additionally, the gateway devices can be routers or layer 3 devices. Moreover, in some embodiments, the redundancy group can be an HSRP group or a VRRP group.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which:

FIG. 1A is a schematic diagram of an HSRP gateway service for hosts in a LAN.

FIG. 1B is a schematic diagram of an HSRP gateway service for hosts in a LAN showing a failover mode when one of the gateway devices fails.

DETAILED DESCRIPTION OF THE EMBODIMENTS

Definitions

Figure 2A:
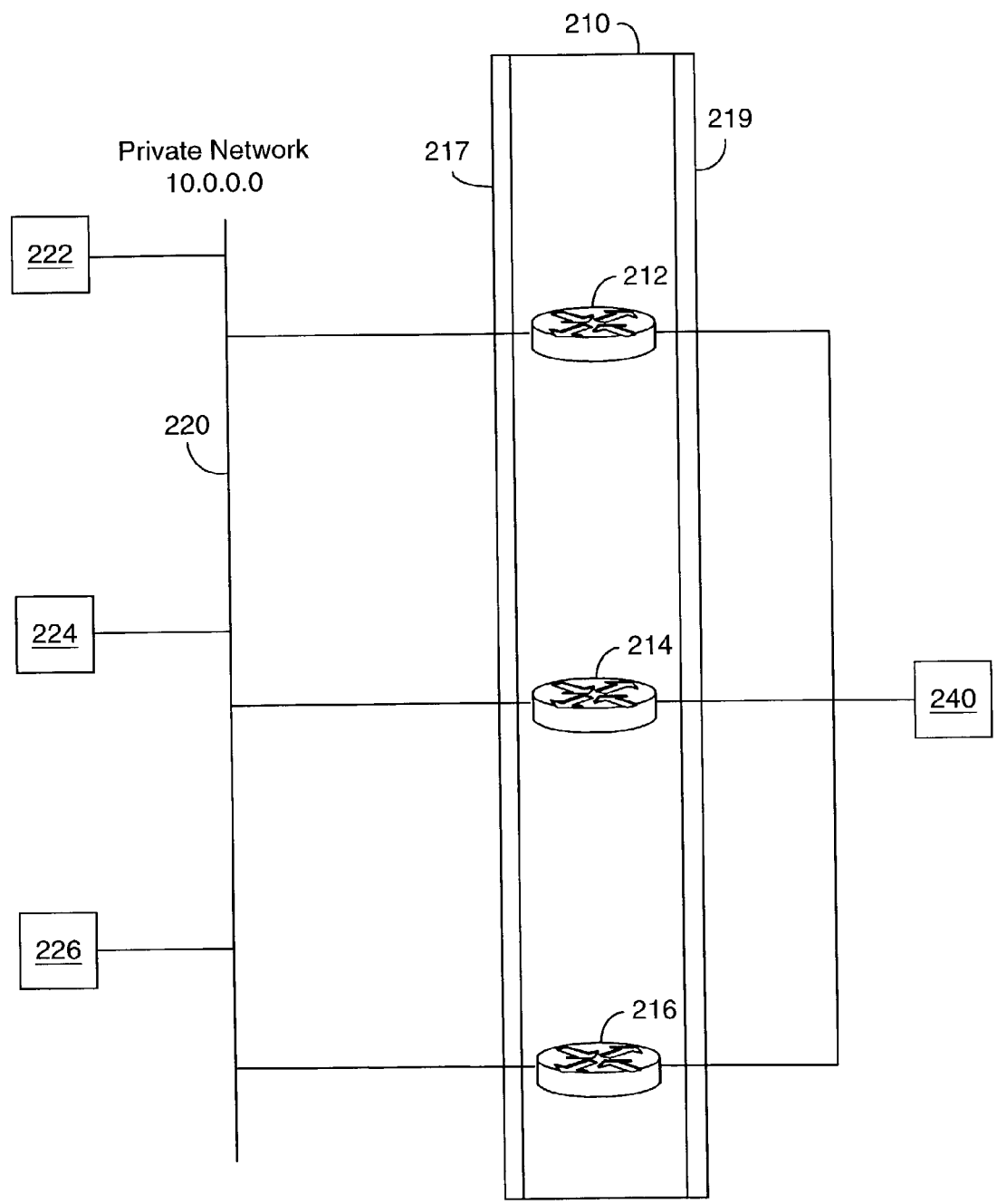
FIG. 2A is a network diagram showing the logical network configuration of a private network connected to an external destination by a redundancy group using one embodiment of the present invention.

Reference will now be made in detail to the preferred embodiment of the invention. An example of the preferred embodiment utilizing products, protocols, methods, systems and other technology developed, sold and/or used by Cisco Systems is illustrated in the accompanying drawings. While the invention will be described in conjunction with that preferred embodiment, it will be understood that it is not intended to limit the invention to one preferred embodiment or to its implementation solely in connection with Cisco products and systems. On the contrary, the following description is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The following terms are used in the instant specification. Their definitions are provided to assist in understanding the preferred embodiments described herein, but do not necessarily limit the scope of the invention. Other definitions may appear or be provided elsewhere in this disclosure and likewise are provided to assist in understanding the preferred embodiments described herein, but do not necessarily limit the scope of the invention.

A "host" is a PC, or other arbitrary network entity residing on a LAN, that periodically communicates with network entities outside the LAN on which the host resides through a router or bridge. The term "user" may be used equivalently in this disclosure.

An "IP (internet protocol) address" is a network layer address for a device operating in the IP suite of protocols. The IP address is typically a 32 bit field, at least a portion of which contains information corresponding to its particular network segment. Thus, the IP address of a router may change depending upon its location in a network.

A "MAC address" is a data link layer device address, defined by the IEEE 802 committee that deals with issues specific to a particular type of LAN. The types of LANs for which MAC (an acronym for Media Access Control) addresses are available include token ring, FDDI and Ethernet. A MAC address generally is intended to apply to a specific physical device no matter where it is plugged into the network. Thus, a MAC address generally is hardcoded into the device—on a router's ROM, for example. This should be distinguished from the case of a network layer address, described above, which changes depending upon where it is plugged into the network. Also, a real MAC address (such as a "burned in address" or BIA MAC address) can be distinguished from a "virtual address" (as defined below) which can include a virtual MAC address.

A "packet" is a collection of data and control information including source and destination node addresses, formatted for transmission from one node to another. In the context of this invention, it is important to note that hosts on one LAN send packets to hosts on another LAN through a router or bridge connecting the LANs.

A "router" is a piece of hardware which operates at the network layer to direct packets between various LANs or WANs of a network. The network layer generally allows pairs of entities in a network to communicate with each other by finding a path through a series of connected nodes. Other terms that may be used in this disclosure include layer 3 switch, layer 3 device and gateway or gateway device which are not necessarily the same as a router, but which may function in the same place and manner as a router. Any and all of these terms are intended to be interpreted as broadly as possible, unless specifically defined more narrowly.

A "switch" is a hardware device operating at the datalink layer, which segments a LAN into separate collision domains.

A "virtual address" is an address, typically shared by a group of real network entities, corresponding to a virtual entity. In the context of this invention, one real router from among two or more real routers emulates a virtual router by adopting the virtual address, and another entity (usually a host) is configured to send data packets to such virtual address, regardless of which real router is currently emulating the virtual router. In the preferred embodiments, the virtual addresses may encompass both MAC layer and network layer (IP) addresses. Usually, various members of the group each have the capability of adopting the virtual address(es) to emulate a virtual entity.

Overview

Hosts in a private network (for example, workstations, users and/or data center servers) using the IP protocol utilize a default gateway to exit a local private network and access remote networks, including public networks. In such settings, each private network host must have prior knowledge of the gateway's IP address which typically is a router or layer-3 switch IP address. Hosts are either statically configured with the IP address of the default gateway or are assigned the address through a configuration protocol (such as DHCP) upon boot-up. In either case, each host uses the same default gateway IP address for all network traffic destined to exit the local private network.

As noted above, redundancy systems can provide improved services for hosts communicating outside a local and/or private network. FIG. 2A is a network diagram showing the logical network configuration of a private network connected to an external destination by a redundancy group using one embodiment of the present invention. While FIG. 2A is greatly simplified for purposes of illustration, the examples presented in connection with the Figures provide those skilled in the art with a knowledge of how the present invention is implemented and used. For example, the system illustrated in FIG. 2A will be explained using Cisco's HSRP redundant gateway system.

Other IP redundancy schemes and/or protocols can utilize the present invention in analogous ways and such analogous implementations and uses will be apparent to those skilled in the art. Therefore, terminology used to describe one or more embodiments of the present invention is not limited to a single redundancy system. For example, a gateway device that is said to be an "active router" or "active gateway device" or is in an "active operating mode" and the like is meant to be a router or other gateway device that is responsible for transmissions out of a given network, such as a private network. A router in such an active operating mode might be a router in the Active state in an HSRP group, a router in the Master state in a VRRP group, or some other analogous device. A router operating in a "standby operating mode" or designated a "standby router" or "standby gateway device" and the like is meant to be a router or other gateway device that is a potential substitute for an active router or other device that is responsible for transmissions out of a given network, such as a private network. A router in such a standby operating mode might be an HSRP router (or other gateway device) in an HSRP Standby state, a VRRP router (or other gateway device) in an VRRP Backup state, or some other similar or analogous device.

In the logical network configuration shown in FIG. 2A, a private network 220 (using address space 10.0.0.0) is connected to a public network or other destination 240 by a logical or virtual router 210. The virtual router 210 includes three "real" or physical routers 212, 214, 216. Virtual router 210 is connected to private network 220 on interface 217 and to destination 240 on interface 219. In FIG. 2A, the system is configured to implement one embodiment of the present invention, as described herein.

As noted above, in each HSRP group only one of the real routers acts as the "Active" router, forwarding packets out of the private network 220. In the present example of one embodiment of the present invention, router 212 is an Active HSRP router, while router 214 is the Standby HSRP router and router 216 is in an HSRP "listen" state, which means that only router 212 is forwarding packets. The Standby router typically is the next router in line for Active status in HSRP in the event the current Active router fails or is otherwise unavailable for operation.

In some cases, however, where an election is held to determine which router in a given HSRP or other redundancy group will take over as the new Active router after the previous Active router fails, the failover time is the time it takes for the redundancy group to be notified of the need to elect a new active router or other gateway device. The present invention will expedite such replacement by shortening the time that elapses between failure of an active gateway device and the notification to other redundancy group members of the need for election of a new active gateway device.

When the LAN interface of the active router 212 fails or the router 212 itself fails, router 212 is unable to communicate with router 214 operating in the standby operating mode to notify router 214 of the need for a substitute active router. Thus, the standby router 214 is unable to take over immediately. Instead, the standby router 214 typically must wait to take over operation in the active operating mode for several seconds, waiting for the scheduled keep-alive message(s) from the active router.

Earlier versions of first hop redundancy protocols (for example, VRRP and HSRP) typically have a failover period of several seconds during which traffic is not forwarded. This is due to the fact that failure detection is based on the non-receipt of periodic, scheduled communications from the active router (for example, keep-alive or Hello notices) for a specified period of time. For example, in HSRP, a router in the standby operating mode might wait for 3 Hello periods (Hello messages broadcast by the Active router in an HSRP redundancy group to notify non-active members that the Active router is still up and running). A typical Hello period is 1 second, so that failure of a router in active operating mode would be detected in 3 seconds.

Figure 2B:
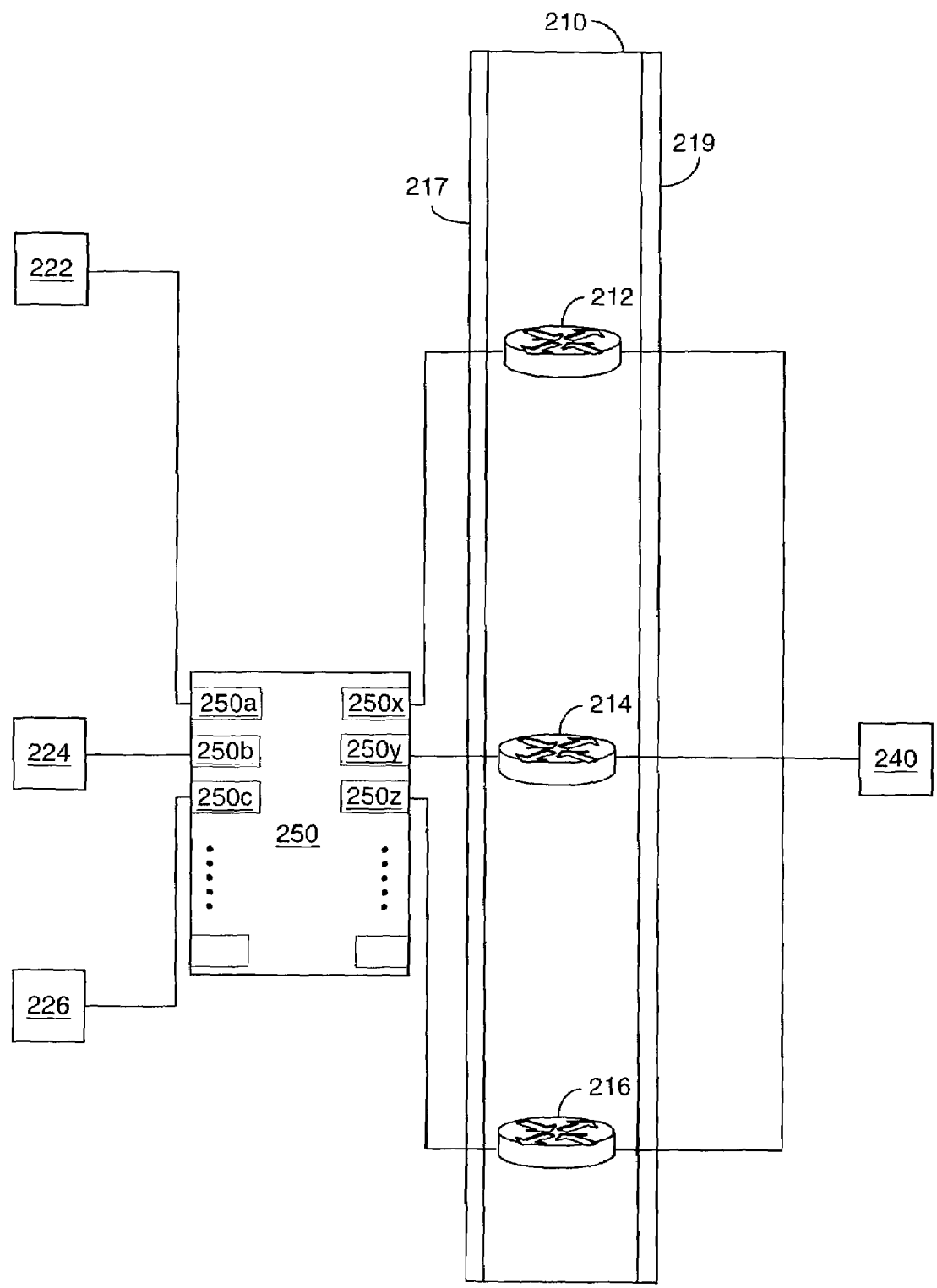
FIG. 2B shows a physical configuration for a system such as that shown in FIG. 2A, including some of the logical connections and relationships among elements in the network diagram of FIG. 2A.

FIG. 2B shows a typical physical configuration for a system such as that shown in FIG. 2A. While FIG. 2A shows the logical connections and relationships among elements in the network diagram of FIG. 2A, FIG. 2B shows at least some of the actual physical connections that typically are used in a system such as that shown in FIG. 2A. For example, in the physical configuration of the illustrated example, a switch 250 typically provides LAN connectivity. Hosts 222, 224 and 226 can be connected to switch ports 250a, 250b and 250c, respectively. Individual real routers 212, 214, 216 are attached to individual switch ports (for example, ports 250x, 250y and 250z, respectively), which the switch can monitor, as will be appreciated by those skilled in the art. In one embodiment of the present invention, a monitoring unit (for example, switch 250) is used to identify the failure of a router operating in the active operating mode for a redundancy group and to communicate a relevant change in status to interested parties, for example the router(s) operating in the standby operating mode. In this way, a standby router can begin operating in the active operating mode for the group, thus reducing forwarding downtime. Instead of waiting for non-receipt of keep-alive messages from an inoperable active router, the standby router can be notified directly and more quickly of the active router's failure or other unavailability by the monitoring unit.

Various methods and apparatus can be used by those skilled in the art to practice the present invention. One mechanism that can be used to achieve this functionality is the embodiment shown in FIG. 2B. Specifically, switch 250 monitors notification multicasts (for example, advertisements) by any router(s) operating in an active operating mode and records information necessary to identify the switch ports to which such active routers are attached. The switch 250 is configured to collect and store advertisement details of this type (and perhaps other collectible information available to the switch 250 that might be useful in performing the present invention) for future use. The switch 250 also may collect and store data regarding all of the routers and/or other devices in a redundancy group connected to the ports of the switch. Any such information and/or data that assists a monitoring unit (for example, a switch) in providing failover and notification functions in accordance with the present invention will be referred to as "gateway device information" or "redundancy group data" herein. In one preferred embodiment of the present invention, the monitoring unit collects only the data needed to identify redundancy group gateway devices operating in an active operating mode and the ports of the monitoring unit to which such active devices are connected.

When a port on the switch 250 fails (for example, when the attached device is no longer active), the switch 250 checks stored redundancy group data in its memory (or memories) to see if router operating in an active operating mode was attached to that port. If the switch 250 determines that an active router was attached to a failed port, then the switch 250 generates a notification message regarding the failed router/port. For example, in VRRP, switch 250 could generate a resignation message (an Advertisement packet with priority equal to zero) and distribute this advertisement to any standby router(s) attached to the switch 250. In this way, the failover period is reduced significantly as compared to previous systems in which the standby routers had to wait for the expiration of a waiting period, thus allowing a standby router to become a new active router more promptly. In systems in which hosts use real BIA MAC addresses for contacting the gateway device (that is, where the acting gateway device responds to ARP requests to the virtual IP address with a real MAC address rather than a virtual MAC address), the switch or the new active router also can send appropriate ARP deletion messages to hosts and/or the other redundancy group members to notify them of the change in status and/or to clear ARP caches that contain the failed gateway device's MAC address or other outdated information. This reduces the chances of hosts sending outgoing packets to the MAC address of the recently failed redundancy group member.

As will be appreciated by those skilled in the art, other devices may function as the monitoring unit in some embodiments of the present invention. A switch 250 was used in the exemplary illustration of FIG. 2B. However, any layer-2 device or other mechanism that allows monitoring of the functioning of the router operating in the active operating mode will be suitable. Layer-2 switches segment a network into separate collision domains. These switches learn the MAC addresses of attached devices, filtering and forwarding packets as appropriate. This ability to learn, retain and later evaluate information about devices attached to the layer-2 switches makes them appropriate devices for use with the present invention. However, any other device or combination of devices that possesses or implements the necessary functionalities can be used as a monitoring unit.

Figure 3:
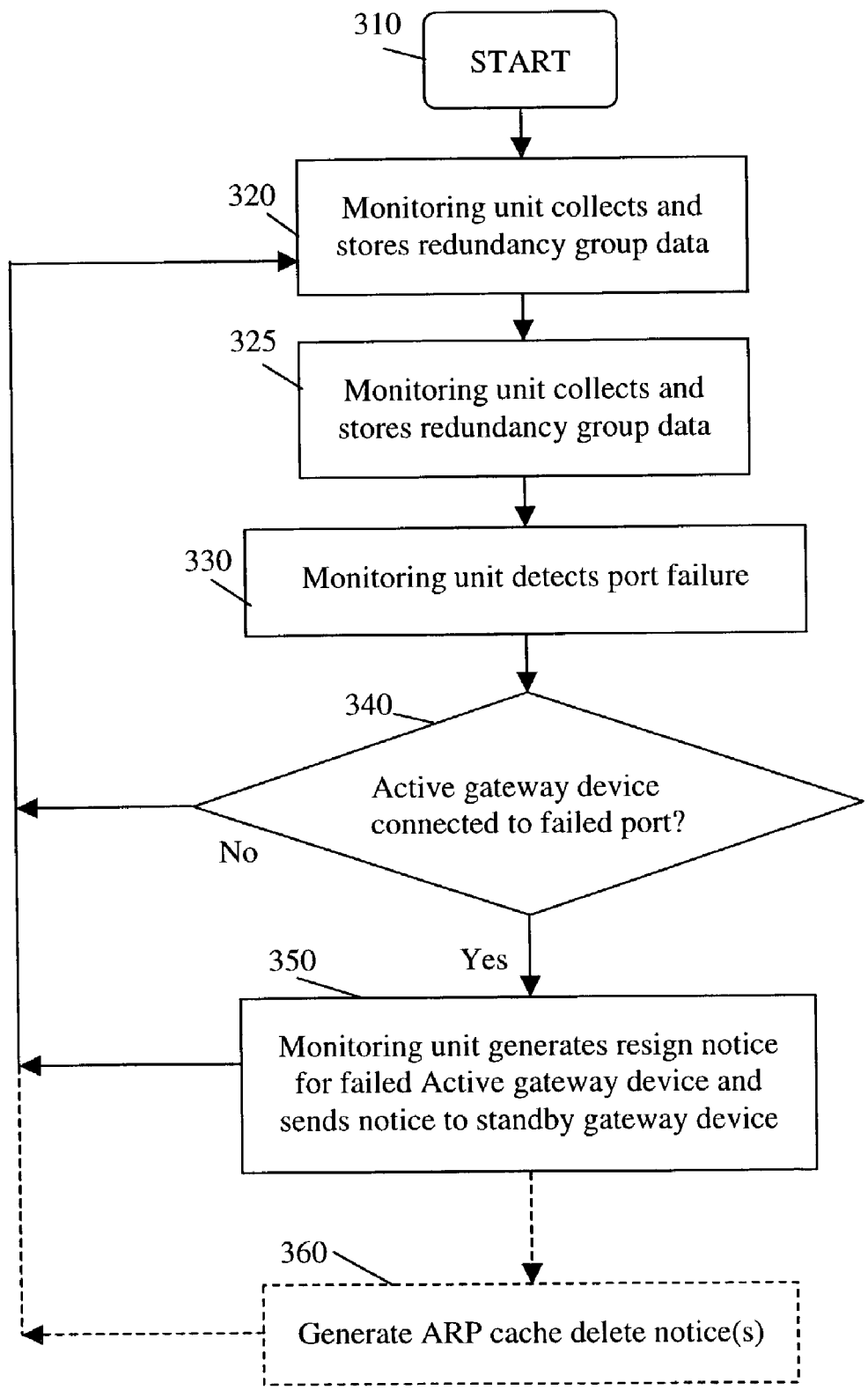
FIG. 3 is a flow diagram showing a methodology using one embodiment of the present invention.

As a further example, FIG. 3 is a flow diagram illustrating one embodiment of the present invention. The flow diagram of FIG. 3 is organized in a manner that might imply that the system checks for certain actions by event loops or polling. No such limitation is intended. Thus, any process flow charts presented and/or discussed herein should not be read to imply that the system necessarily checks for events in the manner and order listed. While this example provides those skilled in the art with an understanding of one methodology of the present invention and an understanding of its use in other contexts, the example presented in FIG. 3 is not to be interpreted as being limited in any way.

The method starts at step 310. At step 320, the monitoring unit collects and stores redundancy group data pertaining to redundancy group gateway devices that are connected to the monitoring unit's ports (although this function may be performed continuously by the monitoring unit). At 325, the monitoring unit monitors its ports that are connected to the redundancy group gateway devices. At step 330, the monitoring unit detects that a port is not functioning. As noted above, this may be due to a failure in the interface between the monitoring unit and the redundancy group gateway device and/or a device failure. At step 340, the monitoring unit then consults its stored redundancy group data regarding the failed gateway device to determine whether the gateway device connected to the failed port was an active device. If the failed gateway device was operating in a standby operating mode, the monitoring unit does nothing and continues its ongoing monitoring, collection and storage functions at step 320.

However, if the failed member was an active gateway device at the time of the failure, then at step 350 the monitoring unit takes steps to expedite the failover upgrade of a standby gateway device to its active operating mode. The monitoring unit issues a message to any gateway devices operating in the standby operating mode in the redundancy group (for example, the monitoring unit can issue a resignation message on behalf of the failed active gateway device or any other suitable notification). At step 360, the monitoring unit also may notify hosts at the same time of the change in gateway device status and advise the hosts to delete any ARP entries for the MAC address of the failed active gateway device. In some cases, it may be possible for the monitoring unit to notify hosts of the MAC address of the new active gateway device to cache for ARP purposes. This may not be appropriate and/or feasible in some cases (for example, when the redundancy group must still elect an active member or in cases where the redundancy group uses a virtual MAC address that does not change after failure of an active gateway device).

Generally, the techniques for implementing the present invention may be implemented in software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple ports to which appropriate gateway devices can be connected. Specific examples of such network devices include switches. For example, the packet processing systems of this invention may be incorporated in specially configured switches such as a model from the Catalyst 3000, 4000, 5000 or 6000 ranges available from Cisco Systems, Inc. of San Jose, Calif. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 4:
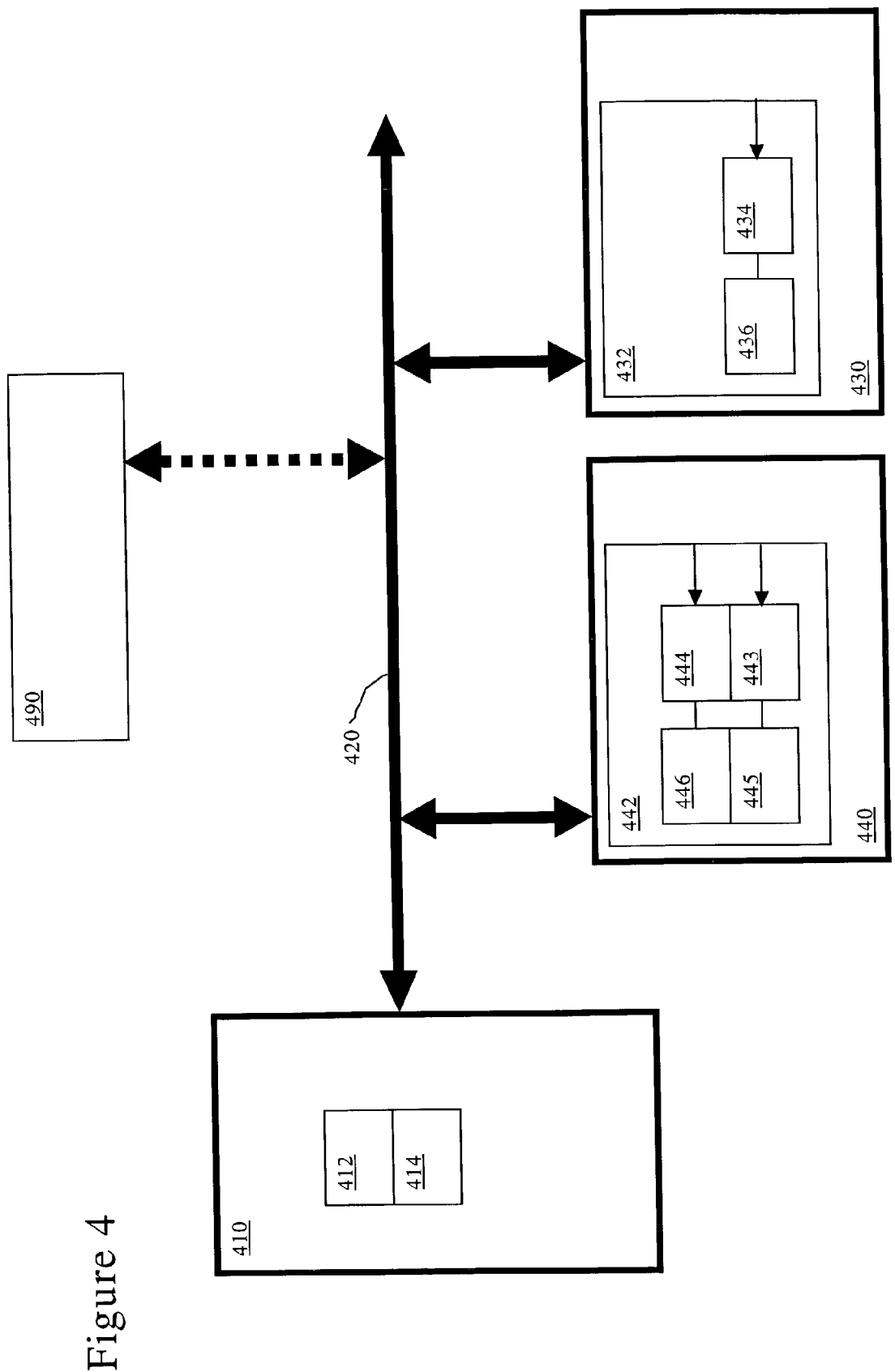
FIG. 4 is a diagrammatic representation of a switch or other layer-2 device in which embodiments of the present invention may be implemented.

Referring now to FIG. 4, a switch 400 suitable for acting as a monitoring unit (for example, the monitoring unit 250 of FIG. 2B) and thus implementing embodiments of the present invention is shown. This switch 400 incorporates the relevant components of a Cisco Catalyst 6000 switch or similar device, which can be used as the monitoring unit 250 in FIG. 2B.

The switch 400 in FIG. 4 includes a switching fabric 420 to which is attached a supervisor module 410 and one or more linecards 430, 440 (two linecards are shown for purposes of illustration; as will be appreciated by those skilled in the art, fewer or more linecards 490 may be used). The linecards 430, 440 may implement specialized or non-specialized port modules. The switching fabric 420 can implement a data bus, a control bus and/or a results bus, as appropriate. The supervisor module 410 may include a processor 412, which can, among other things, support the linecards 430, 440 and manage the multi-layer switching capability. The supervisor module also may include one or more memory units 414, if appropriate. Finally, the supervisor module can contain one or more switch management units, feature cards and tables as will be appreciated by those skilled in the art. The particular features of a supervisor module 410 may be selected and implemented by those skilled in the art as desired. The linecards 430, 440 provide support for various physical interfaces, for example, 10/100 Mbps Ethernet and Gigabit Ethernet.

The linecards 430, 440 may have a plurality of ports 432, 442, respectively, each of which can include one or more appropriate application specific integrated circuit (ASIC) devices 434, 443, 444 and respective associated memory buffers 436, 445, 446 which may be used for transmission and reception of packets passing through the switch 400. The basic architecture of these types of devices and features is well known to those skilled in the art and alternate embodiments of this type of switching device and other devices usable as the monitoring unit could be used in implementing one or more embodiments of the present invention.

As will be appreciated by those skilled in the art, the switch also may be simplified. For example, a switch for use with the present invention could be as simple as a single card having a processor, a memory and a number of physical Ethernet ports (for example, 10/100 Mbps). In fact, in some cases, implementation of one or more of the embodiments of the present invention could be enhanced by such a simplified monitoring unit. Therefore, the above detailed description of a switch is solely for purposes of illustration of the present invention and in no way limits the scope of the invention as claimed herein. As used herein and in the claims that follow, the term "processor" means any one component (for example, without limitation, the supervisor module 410 or one of the ASIC devices 434, 443, 444) or a combination of components in a device such as switch 400 that can provide the control and processing functions required by the present invention, as would be understood by one skilled in the art. Similarly, the term "memory" means any one component (for example, without limitation, a memory buffer in the supervisor module 410 or one of the buffers 436, 445, 446) or combination of components in a device such as switch 400 that can provide the data storage and/or buffering functions required by the present invention, as would be understood by one skilled in the art. As used in the claims, these terms are intended to be construed in their broadest sense. Any memory and processor used by switch 400 in implementing embodiments of the present invention may be located, connected and configured in appropriate ways known in the art.

When acting under the control of appropriate software or firmware, the switch 400 is responsible for such tasks as table computations, monitoring of ports in use and network management. It preferably accomplishes all these functions under the control of software including an operating system (for example, the Catalyst OS of Cisco Systems, Inc.) and any appropriate applications software. Additional memory may be used for a variety of purposes such as, for example, caching and/or storing data, programming instructions, etc.

Regardless of a device's configuration, it may employ one or more memories or memory modules configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A failover monitoring unit comprising:
    a memory; and
    a processor coupled to the memory;
    a plurality of gateway ports connected to the processor, wherein each gateway port is configured to connect a gateway device to the monitoring unit;
    wherein the memory and the processor are configured to collect and store redundancy group data pertaining to a redundancy group comprising a plurality of gateway devices connected to the monitoring unit, wherein the redundancy group comprises an active gateway device and a standby gateway device;
    further wherein the memory and the processor are configured to monitor the plurality of gateway ports to detect failure of an active gateway device;
    further wherein the memory and the processor are configured to notify each redundancy group standby gateway device of the active gateway device failure; and
    further wherein the failover monitoring unit is not a member of the redundancy group.

2. The failover monitoring unit of claim 1 wherein the monitoring unit is a layer 2 switch.

3. The failover monitoring unit of claim 1 wherein each gateway device is a router.

4. The failover monitoring unit of claim 1 wherein each gateway device is a layer 3 device.

5. The failover monitoring unit of claim 3 wherein the redundancy group is an HSRP group.

6. The failover monitoring unit of claim 3 wherein the redundancy group is a VRRP group.

7. The failover monitoring unit of claim 1 wherein the plurality of gateway devices is configured to provide first hop redundancy services wherein the standby gateway device takes over for the active gateway device in the event that the active gateway device fails.

8. The failover monitoring unit of claim 1 wherein the memory and the processor are configured to notify each redundancy group standby gateway device of the active gateway device failure by issuing a resignation message on behalf of the failed active gateway device.

9. A failover device comprising a layer 2 switch, the switch comprising:
    a memory; and
    a processor coupled to the memory;
    a plurality of ports connected to the memory and the processor, wherein each port in the plurality of ports is configured to connect a router to the switch;
    wherein the memory and the processor are configured to collect and store redundancy group data pertaining to a redundancy group comprising a plurality of routers connected to the switch, wherein the redundancy group comprises an active router and a standby router;
    further wherein the memory and the processor are configured to detect failures of active routers; and further wherein the memory and the processor are configured to notify the redundancy group standby router of active router failure; and further wherein the layer 2 switch does not serve as a member of the redundancy group.

10. The failover device of claim 9 wherein the redundancy group is an HSRP group.

11. The failover device of claim 9 wherein the redundancy group is a VRRP group.

12. The failover device of claim 9 wherein the plurality of routers is configured to provide first hop redundancy services wherein the standby muter takes over for the active router in the event that the active router fails.

13. The failover monitoring unit of claim 9 wherein the memory and the processor are configured to notify each redundancy group standby router of the active router failure by issuing a resignation message on behalf of the failed active router.

14. A method of performing failover in a redundancy group, the method comprising:
collecting and storing redundancy group data in a monitoring unit connected to a redundancy group but not a member of the redundancy group, wherein the redundancy group comprises a plurality of gateway devices comprising an active gateway device and a standby gateway device;
monitoring the redundancy group gateway devices;
detecting a failure of the redundancy group active gateway device; and
notifying the redundancy group stay gateway device of the active gateway device failure.

15. The method of claim 14 wherein the monitoring unit is a layer 2 switch having a plurality of ports, wherein each gateway device is connected to one of the ports.

16. The method of claim 14 wherein detecting a failure of the redundancy group active gateway device comprises:
detecting failure of a gateway device connected to the monitoring unit; and
consulting the redundancy group data to determine whether the failed gateway device is the active gateway device.

17. The method of claim 14 wherein each gateway device is a router.

18. The method of claim 14 wherein each gateway device is a layer 3 device.

19. The method of claim 14 wherein the redundancy group is an HSRP group.

20. The method of claim 14 wherein the redundancy group is a VRRP group.

21. The method of claim 14 wherein the plurality of gateway devices is configured to provide first hop redundancy services wherein the standby gateway device takes over for the active gateway device in the event that the active gateway device fails.

22. The method of claim 14 wherein the redundancy group data comprises information about the identity of the active gateway device and the standby gateway device.

23. A method of performing failover in a redundancy group, the method comprising:
collecting and storing redundancy group data in a layer 2 switch connected to a redundancy group but not itself a member of the redundancy group, wherein the redundancy group comprises a plurality of routers, the plurality of routers comprising an active router and a standby router;
monitoring the redundancy group routers;
detecting a ailed redundancy group router connected to a monitoring unit of the layer 2 switch;
determining that the failed redundancy group router is the active router; and
notifying the redundancy group standby router of the active router failure.

24. The method of claim 23 wherein the redundancy group is an HSRP group.

25. The method of claim 23 wherein the redundancy group is a VRRP group.

26. The method of claim 23 wherein the plurality of routers is configured to provide first hop redundancy services wherein the standby router takes over for the active muter in the event that the active router fails.

27. The method of claim 23 wherein the redundancy group data comprises information about the identity of the active gateway device and the standby gateway device.

28. Apparatus for performing failover in a redundancy group, the apparatus comprising:
means for monitoring the redundancy group gateway devices connected to the means for monitoring, wherein the means for monitoring does not serve as a member of the redundancy group;
means for collecting and storing redundancy group data in the means for monitoring, wherein the redundancy group comprises a plurality of gateway devices comprising an active gateway device and a standby gateway device;
means for detecting a failure of the redundancy group active gateway device;
means for notifying the redundancy group standby gateway device of the active gateway device failure.

29. The apparatus method of claim 28 wherein the monitoring means is a layer 2 switch having a plurality of ports, wherein each gateway device is connected to one of the ports.

30. The apparatus of claim 28 wherein the detecting means comprises:
means for detecting failure of a gateway device connected to the monitoring unit; and
means for consulting the redundancy group data to determine whether the failed gateway device is the active gateway device.

31. The apparatus of claim 28 wherein each gateway device is a router.

32. The apparatus of claim 28 wherein each gateway device is a layer 3 device.

33. The apparatus of claim 28 wherein the redundancy group is an HSRP group.

34. The apparatus of claim 28 wherein the redundancy group is a VRRP group.

35. The apparatus of claim 28 wherein the plurality of gateway devices is configured to provide first hop redundancy services wherein the standby gateway device takes over for the active gateway device in the event that the active gateway device fails.

36. The apparatus of claim 28 wherein the redundancy group data comprises information about the identity of the active gateway device and the standby gateway device.

37. A computer program product for implementing a method of performing failover in a redundancy group, wherein the gateway device handles transmissions into and out of a first network only when the gateway device operating in the active operating mode, the computer program product including a machine-readable media having computer readable code embodied therein, the computer readable code comprising:

computer code for collecting and storing redundancy group data in a monitoring unit connected to a redundancy group but not itself a member of the redundancy group, wherein the redundancy group comprises a plurality of gateway devices comprising an active gateway device and a standby gateway device;

computer code for monitoring the redundancy group gateway devices;

computer code for detecting a failure of the redundancy group active gateway device;

computer code for notifying the redundancy group standby gateway device of the active gateway device failure.

38. The computer program product of claim 37 wherein the monitoring unit is a layer 2 switch having a plurality of ports, wherein each gateway device is connected to one of the ports.

39. The computer program product of claim 37 wherein the computer code for detecting a failure of the redundancy group active gateway device comprises:

computer code for detecting failure of a gateway device connected to the monitoring unit; and computer code for consulting the redundancy group data to determine whether the failed gateway device is the active gateway device.

40. The computer program product of claim 37 wherein each gateway device is a router.

41. The computer program product of claim 37 wherein each gateway device is a layer 3 device.

42. The computer program product of claim 37 wherein the redundancy group is an HSRP group.

43. The computer program product of claim 37 wherein the redundancy group is a VRRP group.

44. The computer program product of claim 37 wherein the plurality of gateway devices is configured to provide first hop redundancy services wherein the standby gateway device takes over for the active gateway device in the event that the active gateway device fails.

45. The computer program product of claim 37 wherein the redundancy group data comprises information about the identity of the active gateway device and the standby gateway device.

* * * * *